United States Patent [19]
Nasser, Jr. et al.

[11] Patent Number: 5,558,044
[45] Date of Patent: Sep. 24, 1996

[54] ILLUMINATED DOG LEASH HANDLE

[76] Inventors: Joseph E. Nasser, Jr.; Nancy M. Nasser, both of 2 Greenway Rd., Windham, N.H. 30387

[21] Appl. No.: 468,809

[22] Filed: Jun. 6, 1995

[51] Int. Cl.$^6$ ............................................. A01K 27/00
[52] U.S. Cl. .................................................. 119/796
[58] Field of Search ........................... 119/795, 769, 119/792, 795, 797, 858, 859

[56] References Cited

U.S. PATENT DOCUMENTS

| | | |
|---|---|---|
| D. 292,616 | 11/1987 | Sexton . |
| D. 300,470 | 3/1989 | Schmidt et al. . |
| D. 346,231 | 4/1994 | Lai . |
| 1,454,530 | 5/1923 | Arnold . |
| 2,779,865 | 1/1957 | Hermeyer et al. . |
| 3,935,443 | 1/1976 | Simmons . |
| 4,513,692 | 4/1985 | Kuhnsman et al. . |
| 4,887,552 | 12/1989 | Hayden . |
| 5,429,075 | 7/1995 | Passarella et al. ............ 119/795 |

*Primary Examiner*—Gene Mancene
*Assistant Examiner*—Thomas Price
*Attorney, Agent, or Firm*—Burns, Doane, Swecker & Mathis, L.L.P.

[57] ABSTRACT

An illuminated animal leash is provided which enables a user to hold a dog leash and direct a flashlight beam easily with one hand. The leash assembly includes a handle having a grip portion and a flashlight portion. A leash having a loop at one end is connectable to the handle by a connecting mechanism which allows the loop of the leash to be removable connected to the handle. Possible connecting mechanisms include a pivotable member, a snap in connection or a clip type connection. The leash may also be permanently attached to the handle as in the case of a retractable leash. The handle is preferably provided with a handle which extends at approximately a 90 degree angle to the beam of light emitted by the flashlight.

18 Claims, 2 Drawing Sheets

ILLUMINATED DOG LEASH HANDLE

BACKGROUND OF THE INVENTION

1. Field of the Invention

The present invention relates to an illuminated dog leash handle for providing illumination while walking a dog at night. More particularly, the present invention relates to an integral dog leash handle and flashlight assembly for holding a dog leash and flashlight in one hand.

2. Description of the Related Art

Illuminated pet collars and leashes are known to be used to enhance the safety of pets at night. These include pet collars having luminous substances applied to the collar or leash to reflect the lights of oncoming vehicles. However, these devices do not provide illumination. Leashes such as those disclosed in U.S. Pat. Nos. 4,887,552 to Hayden and 3,935,443 to Simmons disclose illuminated pet collars and leashes which have a series of small lights positioned within the leashes and collars to improve visibility of the pet to oncoming traffic. Although these illuminated pet collars and leashes improve the safety of the pet by making the pet visible to oncoming traffic, they do not sufficiently improve the visibility of the surrounding area for the person walking a pet at night.

SUMMARY

The present invention provides a combination leash handle and flashlight which enables a person to hold a dog leash and a flashlight easily in one hand and to direct the light of the flashlight in any desired direction while walking a dog at night.

In accordance with one aspect of the invention an illuminated animal leash assembly is provided which includes an elongated leash having a first end and a second end, the second end including a connecting means for connecting the leash to an animal. A light source is provided in the handle for illuminating an area by manipulating the handle to direct the light source to the area. A battery is connected to the light source for energizing the light source. The handle includes a grip portion and a means for connecting the first end of the leash to the handle.

In accordance with another aspect of the invention, an illuminated leash is provided including illumination means for illuminating an area with a beam of light, a handle attached to the illumination means for gripping the illumination means and directing the beam of light in a selected direction, and a leash attached to the handle.

BRIEF DESCRIPTION OF THE DRAWING FIGURES

The invention will be described in greater detail with reference to the accompanying drawings in which like elements bear like reference numerals, and wherein.

DETAILED DESCRIPTION

Figure 1:
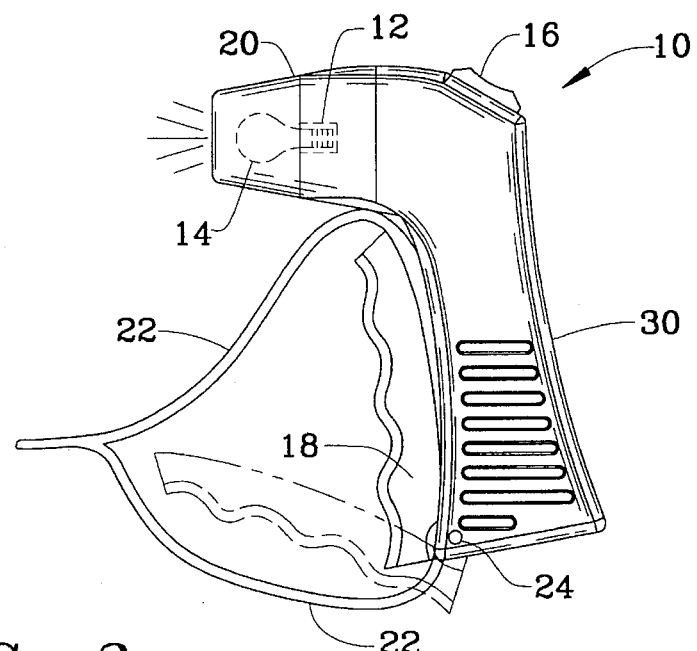
FIG. 1 is a side view of a first aspect of the present invention.

The handle 10 according to the present invention, as shown in FIG. 1, includes a flashlight portion 20 and a grip portion 30. The flashlight portion 20 includes a bulb socket 12 and a replaceable light bulb 14, shown in hidden lines in FIG. 1, in the forward portion of the flashlight portion. The flashlight portion 20 also includes an on/off switch 16 for turning the flashlight on and off. The switch 16 is positioned at a top portion of the handle where it can be easily reached by a user's thumb when the user is gripping the handle at the grip 30. The switch 16 may be a push button switch, a sliding switch or any other type of flashlight switch which is known to those in the art.

The grip portion 30 of the handle includes a pivotable member 18 for holding a loop 22 on the end of a leash. As shown in FIG. 1, the pivotable member 18 is pivoted on the pivot 24 to a lowered, open position which is shown in dashed lines. The pivotable member 18 is connected to the pivot 24 at only one side of the handle (the side shown in FIG. 1). This configuration allows the loop 22 on the end of a leash to be slipped behind the pivotable member 18 on the nonconnected side, as shown in FIG. 1, so that the leash extends parallel to the pivotable member 18. The pivotable member 18 is then moved to a closed position where the loop is trapped between the pivotable member 18 and the rest of the grip portion 30. The user then grasps the grip portion 30 around the pivotable member 18 which prevents the leash from becoming dislodged from the handle. Alternatively, a latch (not shown) may be provided to hold the pivotable member 18 in a closed position.

Figure 2:
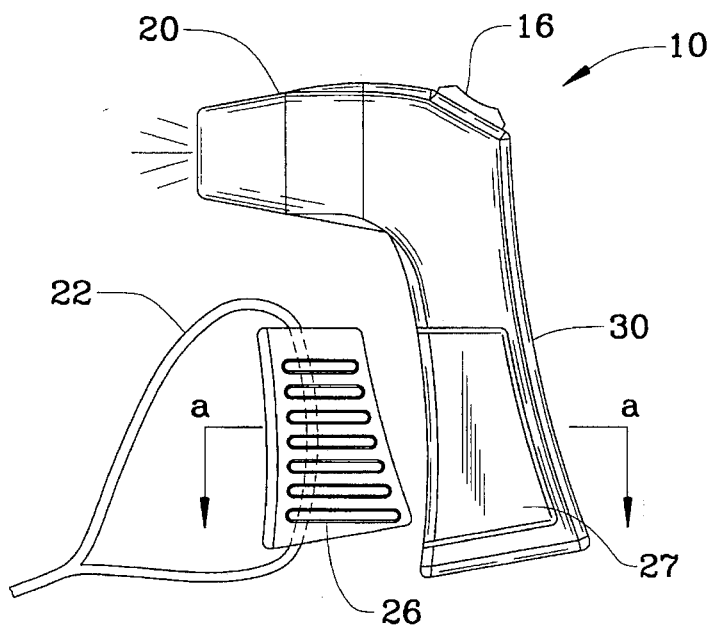
FIG. 2 is an exploded side view of a second aspect of the present invention.
Figure 2A:
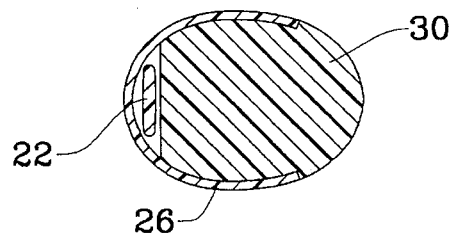
FIG. 2a is a cross sectional view of the handle of FIG. 2, in a closed position, taken along the line a—a.

According to the alternative embodiment shown in FIG. 2, the grip portion 30 of the handle includes a removable front section 26 which engages the remainder of the grip portion 30 in a snap in fit in a recess 27 in the grip portion. The removable front portion 26 has a substantially C-shaped cross section when seen from the bottom so that the C-shaped cross section wraps around the remainder of the grip portion 30. As shown in FIG. 2, the loop 22 of the leash is positioned around the removable front portion 26 through the center of the C-shaped cross section. The removable front portion 26 is then snapped onto the remainder of the grip portion 30 and the user grasps the grip portion 30 around the snapped in front portion 26.

Figure 3:
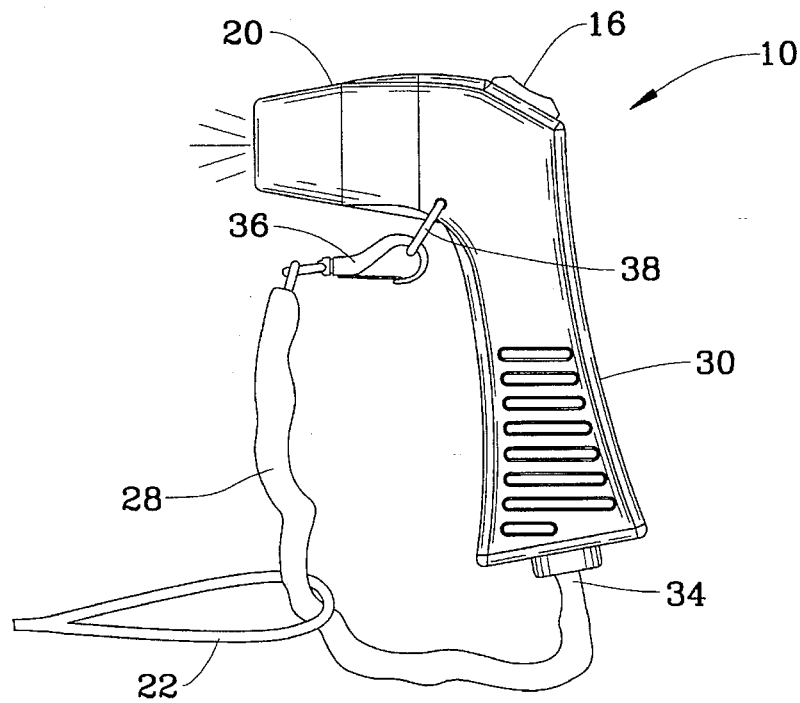
FIG. 3 is a side view of a third aspect of the present invention.

In the alternative embodiment shown in FIG. 3, a flexible elongated member 28 is provided which engages the loop (not shown) of a leash. The elongated member 28 may be formed of any suitable material such as a chain, a strap or a rope. The elongated member 28 is permanently attached at one end 34 to a lower part of the grip portion 30. The other end of the elongated member 28 is provided with a clip 36. The handle 10 is also provided with a loop or bail 38. In use, the end of the elongated member having the clip 36 is passed though the loop of a leash and the clip is then attached to the bail 38. In this way the leash is securely attached to the handle 10.

Figure 4:
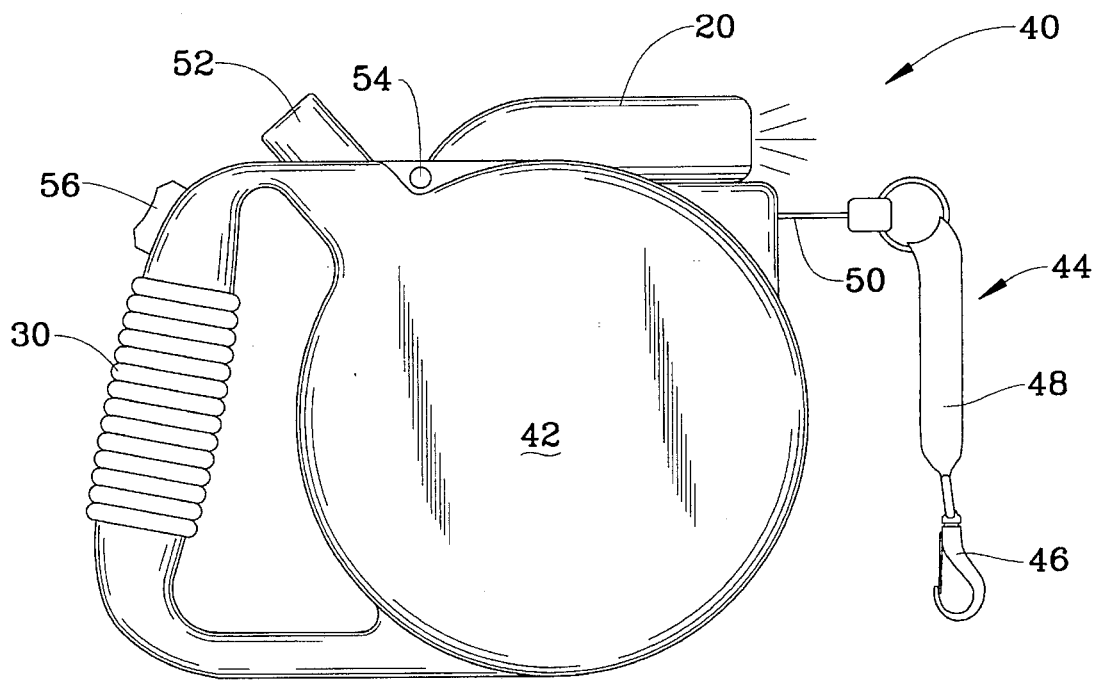
FIG. 4 is a side view of a fourth aspect of the present invention.

In the alternative embodiment shown in FIG. 4, a retractable leash assembly 40 is provided including a flashlight. The retractable leash assembly 40 includes a grip portion 30, a retracting mechanism 42, a flashlight portion 20 and a leash 44. The leash 44 includes a clip 46 for clipping on a pet's collar which is attached to a strap 48. The strap is attached to a cord 50 which is retracted into the retractable leash assembly by the retracting mechanism 42. The cord 50 can be prevented from retracting by holding in the button 52, or by locking the button 52 in a closed position by the lock 54. The retractable leash assembly 40 is preferably provided with an on/off button 56 on the grip portion 30. However, the on/off button may be positioned anywhere where it is easily accessible to the user.

In each of the forgoing embodiments a longitudinal axis through the center of the grip portion 30 may be provided at approximately 90 degrees to the direction of the flashlight beam. More particularly, the angle is preferably slightly greater than 90 degrees. Therefore, a user can comfortably hold the handle 10 in a closed hand and direct the flashlight beam in the direction in which they are traveling while the leash extends from the handle.

While the invention has been described in detail with reference to the preferred embodiments thereof, it will be apparent to one skilled in the art that various changes can be made, and equivalents employed without departing from the spirit and scope of the invention.

What is claimed is:

1. An illuminated animal leash assembly comprising:
   an elongated leash having a first end and a second end, the second end including a connecting means for connecting the leash to an animal;
   a handle having a grip portion;
   a light source in the handle for illuminating an area by manipulating the handle to direct the light source to the area;
   a battery connected to the light source for energizing the light source; and
   means for connecting the first end of the leash to the handle, said means for connecting including a movable member which is movable between an open position and a closed position, the movable member forming a means for trapping a portion of the elongated leash between the movable member and the handle when in the closed position.

2. The illuminated animal leash assembly of claim 1, wherein the light source includes a socket and the socket is positioned at approximately 90 degrees to a longitudinal axis of the grip.

3. The illuminated animal leash assembly of claim 1, further comprising an on/off switch positioned on the handle.

4. The illuminated animal leash assembly of claim 1, wherein the first end of the leash includes a loop.

5. The illuminated animal leash assembly of claim 4, wherein the movable member includes a pivotable member pivotally attached to the handle engaging the loop of the leash.

6. The illuminated animal leash assembly of claim 5, wherein the pivotable member is movable from an open position to a closed position, and the loop is positioned around the pivotable member in the open position and is held in place by moving the pivotable member to the closed position.

7. The illuminated animal leash assembly of claim 5, wherein the pivotable member is a part of the grip portion.

8. The illuminated animal leash assembly of claim 4, wherein the movable member includes a snap in member.

9. The illuminated animal leash assembly of claim 8, wherein the loop of the leash is positioned around the snap in member and the snap in member is removably attached to the handle.

10. The illuminated animal leash assembly of claim 8, wherein the snap in member is a part of the grip portion of the handle.

11. The illuminated animal leash assembly of claim 4, wherein the movable member includes a flexible elongated member connected at a first end to the handle and removably connectable at a second end to the handle.

12. The illuminated animal leash assembly of claim 11, wherein the second end of the flexible elongated member includes a clip for removable attaching the second end of the flexible elongated member to the handle.

13. An illuminated animal leash assembly comprising:
   an elongated leash having a first end and a second end, the second end including a connecting means for connecting the leash to an animal;
   a handle having a grip portion, wherein the grip portion has a longitudinal grip axis;
   a light source in the handle for illuminating an area by manipulating the handle to direct the light source to the area, wherein the light source directs light at approximately 90 degrees to the longitudinal grip axis;
   a battery connected to the light source for energizing the light source; and
   means for connecting the first end of the leash to the handle.

14. An illuminated animal leash assembly comprising:
   an elongated leash having a first end and a second end, the second end including a connecting means for connecting the leash to an animal;
   a handle having a grip portion;
   a light source in the handle for illuminating an area by manipulating the handle to direct the light source to the area;
   a battery connected to the light source for energizing the light source; and
   means for connecting the first end of the leash to the handle, wherein the first end of the leash is connected to a retractable mechanism in the handle.

15. An illuminated leash comprising: illumination means for illuminating an area with a beam of light;
   a handle attached to the illumination means for gripping the illumination means and directing the beam of light in a selected direction; and
   a leash attached to the handle by a movable member which traps portion of the leash between the movable member and the handle.

16. An illuminated leash comprising:
   illumination means for illuminating an area with a beam of light;
   a handle attached to the illumination means for gripping the illumination means and directing the beam of light in a selected direction, the handle having a longitudinal axis and the illumination means directs the beam of light at approximately 90 degrees to the longitudinal axis; and
   a leash attached to the handle.

17. The illuminated leash of claim 15, wherein the illumination means includes a socket with a socket axis, said socket axis being positioned at approximately 90 degrees to a longitudinal axis of the handle.

18. An illuminated animal leash assembly comprising:

an elongated leash having a first end and a second end, the first end including a loop, and the second end including a connecting means for connecting the leash to an animal;

a handle having a grip portion;

a light source in the handle for illuminating an area by manipulating the handle to direct the light source to the area;

a battery connected to the light source for energizing the light source; and means for connecting the first end of the leash to the handle, wherein the means for connecting the first end of the leash to the handle includes a pivotable member pivotally attached to the handle engaging the loop of the leash.

* * * * *